United States Patent [19]

Vignes et al.

[11] Patent Number: 5,132,508
[45] Date of Patent: Jul. 21, 1992

[54] HEAD FOR LASER WORKING WITHIN A TUBE

[75] Inventors: Alain Vignes, Paris; Jacques Griffaton, Chalon S/Saone, both of France

[73] Assignee: Framatome, Courbevoie, France

[21] Appl. No.: 634,619

[22] Filed: Dec. 27, 1990

[30] Foreign Application Priority Data

Dec. 28, 1989 [FR] France ............................ 89 17377

[51] Int. Cl.$^5$ .................................................. B23K 26/00
[52] U.S. Cl. ............................ 219/121.63; 219/121.74; 219/121.77
[58] Field of Search ............... 219/121.63, 121.64, 219/121.74, 121.75, 121.77; 359/629

[56] References Cited

U.S. PATENT DOCUMENTS

| | | | |
|---|---|---|---|
| 4,827,098 | 5/1989 | Kasner et al. | 219/121.63 |
| 4,839,495 | 6/1989 | Kitera et al. | 219/121.63 |
| 4,978,834 | 12/1990 | Griffaton | 219/121.63 |

FOREIGN PATENT DOCUMENTS 0298374 1/1989 European Pat. Off. .

Primary Examiner—C. L. Albritton
Attorney, Agent, or Firm—Pollock, Vande Sande & Priddy

[57] ABSTRACT

The tubular casing (3) of the working head (1) exhibits two windows, upstream (4) and downstream (5), opposite each one of which there is mounted a deflecting mirror, a partially reflecting mirror (12) and a totally reflecting mirror (14) respectively. A first optical focusing device (8) is mounted in front of the upstream mirror, and a second optical focusing device (13) is mounted between the downstream mirror and the image focus (11) of the upstream optical device.

Application to the simultaneous performance of a plurality of circular welds in tubes of small diameter.

6 Claims, 2 Drawing Sheets

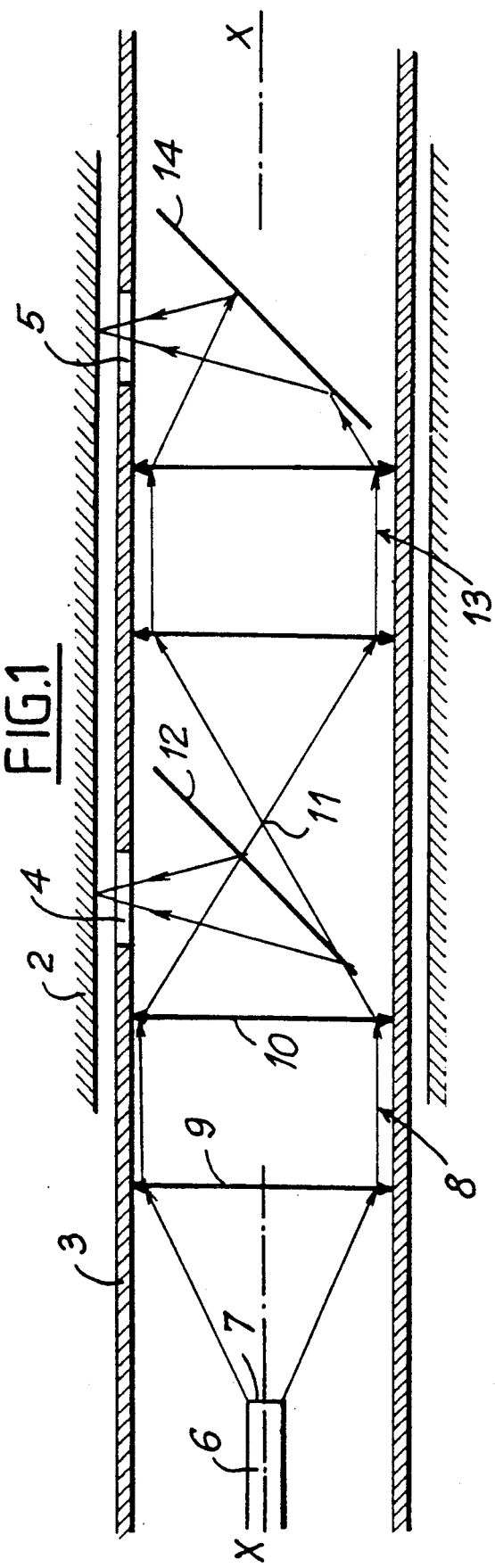
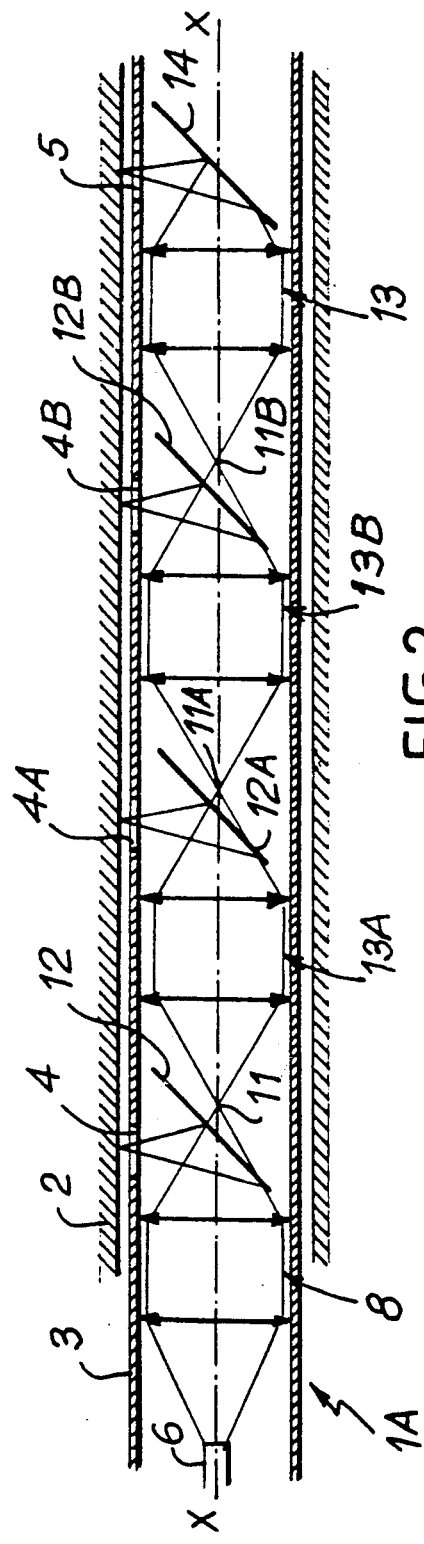

HEAD FOR LASER WORKING WITHIN A TUBE

The present invention relates to a head for laser working within a tube. It is applied, in particular, to the performance of circular welds in tubes of small diameter, for example for the sealed fixing or the socket mounting of the tubes of the steam generators of pressurized-water nuclear reactors.

In the current art (see, for example, the patent application FR-88/13,602 in the name of the Applicant), a laser beam is carried, for example by optical fibre, to an inclined deflecting mirror preceded by an optical focusing device. The focused beam emerges from the working head through a lateral window of the latter, and the head is caused to turn through a complete turn in order to execute a circular weld.

The operations to be performed frequently involve a plurality of circular working zones spaced axially from one another. It is then necessary to repeat on a plurality of occasions the operations of positioning and of adjustment of the working head.

The object of the invention is to perform multiple operations in a far shorter time.

To this end, the head for laser working according to the invention comprises:

- a tubular casing exhibiting a downstream window and at least one upstream window, these windows being spaced axially from one another;
- opposite the downstream window, a downstream deflecting mirror, which is inclined and totally reflecting;
- opposite the or each upstream window, an upstream deflecting mirror, which is inclined and partially reflecting;
- upstream of each mirror, an optical device for focusing the laser beam onto a working zone situated level with the corresponding window;
- each optical device being disposed between the associated mirror and the image focus of the optical device situated immediately upstream.

Some embodiments of the invention will now be described with reference to the accompanying drawings, in which:

FIG. 1 diagrammatically represents, in longitudinal cross-section, a head for laser working according to the invention;

FIG. 2 is a similar view, on a smaller scale, of a variant; and

Figure 3:
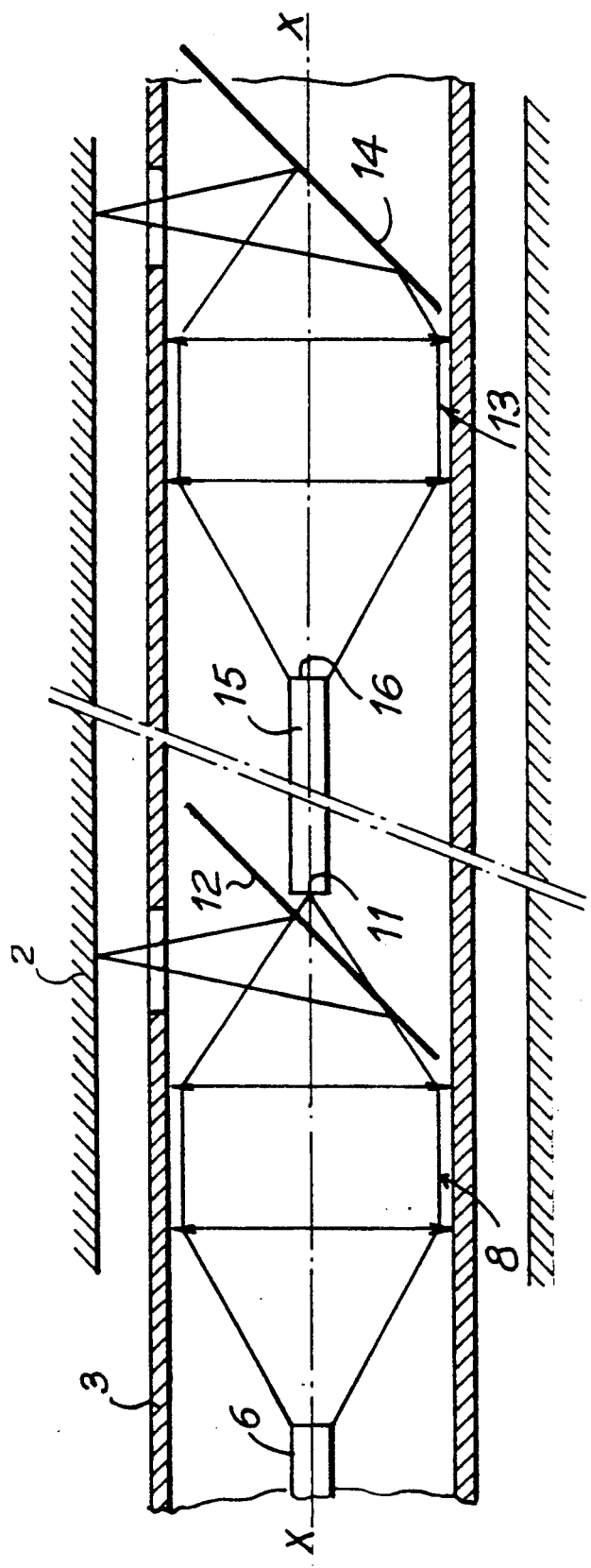
FIG. 3 is a similar view, on a larger scale, of another variant.

FIG. 1 shows only the downstream part of a laser welding head 1, the general structure of which may be that described in the aforementioned French patent application. This head 1 is intended to execute simultaneously two circular welds in a tube 2, the internal diameter of which is slightly greater than the external diameter of the cylindrical external casing 3 of the head 1. The operation may involve, in particular, the fixing by welding of a repair sleeve in a tube, according to the technique in current use for the maintenance of the primary water tubes of the steam generators of pressurized-water nuclear reactors.

The casing 3 exhibits, on one and the same generatrix, two laser beam exit windows, namely an upstream window 4 and a downstream window 5. The axes of these windows have between them the same axial spacing (that is to say along the general axis X—X of the assembly) as the two welds to be executed, and the head 1 is positioned and centred in a corresponding manner in the tube 2, by conventional means (not shown).

The part of the head 1 which is illustrated in FIG. 1 comprises in the casing 3, from upstream to downstream:

- an optical fibre 6 which emits the initial laser beam through its downstream end 7, which is centred on the axis X—X;
- a first optical focusing device (8) comprising at least two converging lenses 9 and 10;
- between the device 8 and its image focus 11, a semi-reflecting mirror 12 inclined at 45°, which is adapted to pass 50% of the focused beam towards the upstream working zone of the tube 2, through the window 4, the remainder of the beam not being deflected and being focused at the focus 11;
- a second optical device 13, which is similar to the device 8 and which is disposed downstream of the focus 11; and
- a second deflecting mirror 14, which is inclined at 45° and which is totally reflecting and which deflects that part of the beam which is not deflected by the mirror 12 and which is focused by the optical device 13, towards the downstream working zone of the tube 2, through the window 5.

The operation of the head 1 is inferred directly from the aforegoing description: a laser beam, the energy of which is twice that required to execute a weld, is carried by the optical fibre 6, 50% of this beam is focused onto each working zone, and, by causing the head 1 to turn through a complete turn about the axis X—X, the two desired circular welds are executed simultaneously.

The variant 1A of FIG. 2 is intended to execute simultaneously, in a similar manner, a number of circular welds exceeding two, which is equal to four in the example shown. It differs from that of FIG. 1 by the fact that the casing 3 exhibits two additional windows 4A, 4B between the windows 4 and 5, on the same generatrix. A partially reflecting mirror 12A, 12B, inclined at 45°, is disposed opposite each one of these windows, and an optical focusing device 13A, 13B is disposed in front of each one of these mirrors. More specifically, each optical device 13A, 13B and 13 is disposed between the mirror situated immediately downstream, 12A, 12B and 14 respectively, and the image focus 11, 11A, 11B, respectively, of the optical device situated immediately upstream, 8, 13A, 13B respectively.

In the case of FIG. 2, the percentage of luminous energy reflected by each mirror is calculated in order that each working zone should receive the same energy, i.e.: 100/4% for the mirror 12, 100/3% for the mirror 12A, and 100/2% for the mirror 12B. More generally, in the case of (n-1) partially reflecting mirrors mounted one behind the other, these mirrors must reflect respectively, from upstream to downstream, 100/n%, 100/(n-1)%, 100(n-2)%, ..., 100/2% of the energy of the initial beam. In all cases, the energy of this initial beam is, of course, equal to n times the energy required to execute a weld.

In the arrangements of FIGS. 1 and 2, the optical characteristics of the optical focusing devices are selected as a function of the centre-to-centre distance of the windows 4 and 5, or 4, 4A, 4B and 5, in such a manner that the image focus of each optical device is at the same time the object focus of the following optical device. If this condition cannot be fulfilled, in particular on account of an excessively great distance between the working zones, it is possible advantageously to use the variant of FIG. 3, in which, with only two windows 4 and 5, an optical fibre 15 extends along the axis X—X of the image focus 11 of the optical device 8 to the object focus 16 of the optical device 13. This variant may, of course, be adapted to the case of the head with multiple mirrors of FIG. 2.

It is noted that each mirror obliquely intercepts a laser beam which is not yet focused, consequently involving a large area of the mirror. Any risk of excessive localized heating of the mirrors is thus avoided.

In a variant, the exit windows of the laser beams could be situated on different generatrices of the working head. The corresponding mirrors would then be turned in relation to one another about the axis X—X.

We claim:

1. Head for laser working within a tube, characterized in that it comprises:

a tubular casing (3) exhibiting a downstream window (5) and at least one upstream window (4; 4, 4A, 4B), these windows being spaced axially from one another;

opposite the downstream window, a downstream deflecting mirror (14), which is inclined and totally reflecting;

opposite the or each upstream window, an upstream deflecting mirror (12; 12, 12A, 12B), which is inclined and partially reflecting;

upstream of each mirror, an optical device (8, 13; 8, 13, 13A, 13B) for focusing the laser beam onto a working zone situated level with the corresponding window;

each optical device being disposed between the associated mirror and the image focus of the optical device situated immediately upstream.

2. Working head according to claim 1, characterized in that all the mirrors (12, 14; 12, 12A, 12B, 14) are inclined at 45°.

3. Head for laser working according to claim 1, characterized in that all the mirrors (12, 14; 12, 12A, 12B, 14) are substantially parallel.

4. Head for laser working according to claim 1, characterized in that the mirrors are turned in relation to one another about the axis (X—X) of the head, the associated windows being provided on different generatrices of the latter.

5. Head for laser working according to claim 1, characterized in that the object focus (11; 11A, 11B) of each optical device is formed by the image focus of the optical device situated immediately upstream.

6. Head for laser working according to claim 1, characterized in that an optical fibre (15) extends from the image focus (11) of an optical device (8) to the object focus (16) of the optical device (13) situated immediately downstream.

* * * * *